United States Patent
Horstman et al.

(10) Patent No.: US 7,789,346 B2
(45) Date of Patent: Sep. 7, 2010

(54) CABIN AIR SUPPLY APPARATUS WITH FILTERED AIR

(75) Inventors: Raymond H. Horstman, Snohomish, WA (US); Richard A. Johnson, Edmonds, WA (US); Chao-Hsin Lin, Redmond, WA (US)

(73) Assignee: The Boeing Company, Chicago, IL (US)

( * ) Notice: Subject to any disclaimer, the term of this patent is extended or adjusted under 35 U.S.C. 154(b) by 963 days.

(21) Appl. No.: 11/536,828

(22) Filed: Sep. 29, 2006

(65) Prior Publication Data

US 2008/0099606 A1 May 1, 2008

(51) Int. Cl.
*B64D 13/00* (2006.01)

(52) U.S. Cl. .................. 244/118.5; 454/76

(58) Field of Classification Search .......... 244/118.5; 454/76, 99, 71–73, 100, 105, 107, 112, 108, 454/137, 152, 301
See application file for complete search history.

(56) References Cited

U.S. PATENT DOCUMENTS

| | | | | |
|---|---|---|---|---|
| 3,687,054 A | * | 8/1972 | Boberg | 454/76 |
| 4,742,760 A | * | 5/1988 | Horstman et al. | 454/76 |
| 4,819,548 A | * | 4/1989 | Horstman | 454/76 |
| 5,695,396 A | * | 12/1997 | Markwart et al. | 454/76 |
| 6,413,159 B1 | * | 7/2002 | Bates et al. | 454/76 |

OTHER PUBLICATIONS

Hunt et al., "Commercial Airliner Environmental Control System", Engineering Aspects of Cabin Air Quality, presented at the Aerospace Medical Association annual meeting, Anaheim, California, May 1995, pp. 1-8.
Hunt et al., "The Airplane Cabin Environment", Issues Pertaining to Flight Attendant Comfort, presented at the International In-flight Service Management Organization Conference, Montreal, Canada, Nov. 1994, pp. 1-12.
"Australia's largest architecture, building, contruction & design website", Dadanco—Boosting aircon output, http://www.infolink.com.au/articles/02/0C00AC02.aspx, printed Jul. 14, 2006, pp. 1-5.
Vanosdell et al., "Defining the Effectiveness of US Lamps Installed in Circulating Air Ductwork", Final Report, Arti International, published Nov. 2002, ARTI-21CR/610-40030-01, cover page thru pp. 41.

* cited by examiner

*Primary Examiner*—Tien Dinh
(74) *Attorney, Agent, or Firm*—Yee & Associates, P.C.; Charles S. Gumpel

(57) ABSTRACT

A method and apparatus for distributing air. The apparatus includes an air distribution vent that distributes air into a compartment, wherein the distribution of air into the compartment causes compartment air from the compartment to be drawn from the compartment. The apparatus also includes a contaminant removal system, wherein compartment air drawn from the compartment is processed to remove contaminants before being distributed back into the compartment by the air distribution vent.

14 Claims, 5 Drawing Sheets

CABIN AIR SUPPLY APPARATUS WITH FILTERED AIR

BACKGROUND OF THE INVENTION

1. Field of the Invention

The present invention relates generally to an apparatus for supplying air to an enclosed space and in particular to an apparatus using a nozzle to supply air to an enclosed space. Still more particularly, the present invention relates to an air supply apparatus that supplies filtered air to a passenger cabin through a nozzle.

2. Description of the Related Art

Cabin air systems for aircraft are designed to provide a safe and comfortable cabin environment at different cruising altitudes. At high altitudes, the passenger cabin is pressurized to enable passengers and crew to breathe normally. Further, in providing air in a pressurized cabin system, outside air is mixed with inside air from the passenger cabin and circulated back into the cabin through the cabin air system. The air is distributed into the passenger cabin through overhead nozzles or outlets. Inside the passenger cabin, the air flows in a circular pattern and exits through floor grills on either side of the cabin or through overhead intakes. Typically, about half of the air exiting the cabin is immediately exhausted from the airplane through an outflow valve. The other half of the air is drawn by fans under the cabin floors, mixed with outside air, and then re-circulated into the passenger cabin. The cabin air system also employs high efficiency filters used to trap contaminants, such as bacteria and viruses.

The potential problem of airborne disease in the passenger cabin is, in part, negated by the dilution ventilation provided by the cabin air system. Further, the use of filters to remove contaminants also reduces the risk of airborne infection because the flow of pathogen-free air to the cabin is increased.

Cabin air systems, however, have a limited capacity in filtering and distributing air. Power use and space limitations are present in an aircraft. As a result, the size and number of both fans and ducts cannot be readily increased. One way used to increase air quality is to reduce the passenger count. By reducing the passenger count, the ventilation flow per person is increased. Reducing passenger count is not a popular solution for many business models because the cost increases on a per passenger basis when the passenger count is reduced. Further, fuel is wasted and flight delays occur through increased traffic needed to move the same number of passengers to different destinations. Therefore, it would be advantageous to have an improved method and apparatus for distributing air into a passenger cabin.

SUMMARY OF THE INVENTION

Advantageous embodiments of the present invention provide a method and apparatus for distributing air. The apparatus comprises an air distribution vent that distributes air into a compartment. The distribution of air into the compartment causes compartment air from the compartment to be drawn from the compartment. The apparatus also comprises a contaminant removal system, wherein compartment air drawn from the compartment is processed to remove contaminants before being distributed back into the compartment by the air distribution vent.

In another embodiment, the apparatus is an aircraft air processing system. In this system, an outlet connects an air supply conduit in an aircraft to a passenger cabin in the aircraft; a first channel connects the passenger cabin to a secondary area in the aircraft; and a second channel connects the passenger cabin to the secondary area in the aircraft. The system also includes a nozzle that is positioned with respect to the outlet and the first channel in a manner such that a first airflow from the outlet through the nozzle draws air from the secondary area through the first channel into the nozzle to form a second airflow that circulates between the passenger cabin and the secondary area through the first channel and the second channel. A contaminant removal system located in the secondary area and removes contaminants from the second airflow in the air entering the secondary area from the passenger cabin through the second channel before the air in the second airflow returns to the passenger cabin through the first channel such that the second airflow contains a reduced amount of contaminants.

The embodiments reduce contaminants in an air supply system by re-circulating air in a first airflow between a main compartment for occupation by a person and a secondary compartment through a plurality of inlets and a plurality of outlets connecting the main compartment and the secondary compartment, wherein the first airflow re-circulates in response to a second airflow moving into the main compartment. Contaminants are removed from the air as the air moves from the main compartment to the secondary compartment The features, functions, and advantages can be achieved independently in various embodiments of the present invention or may be combined in yet other embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment of the present invention when read in conjunction with the accompanying drawings, wherein:

DETAILED DESCRIPTION OF THE PREFERRED EMBODIMENT

Figure 1:
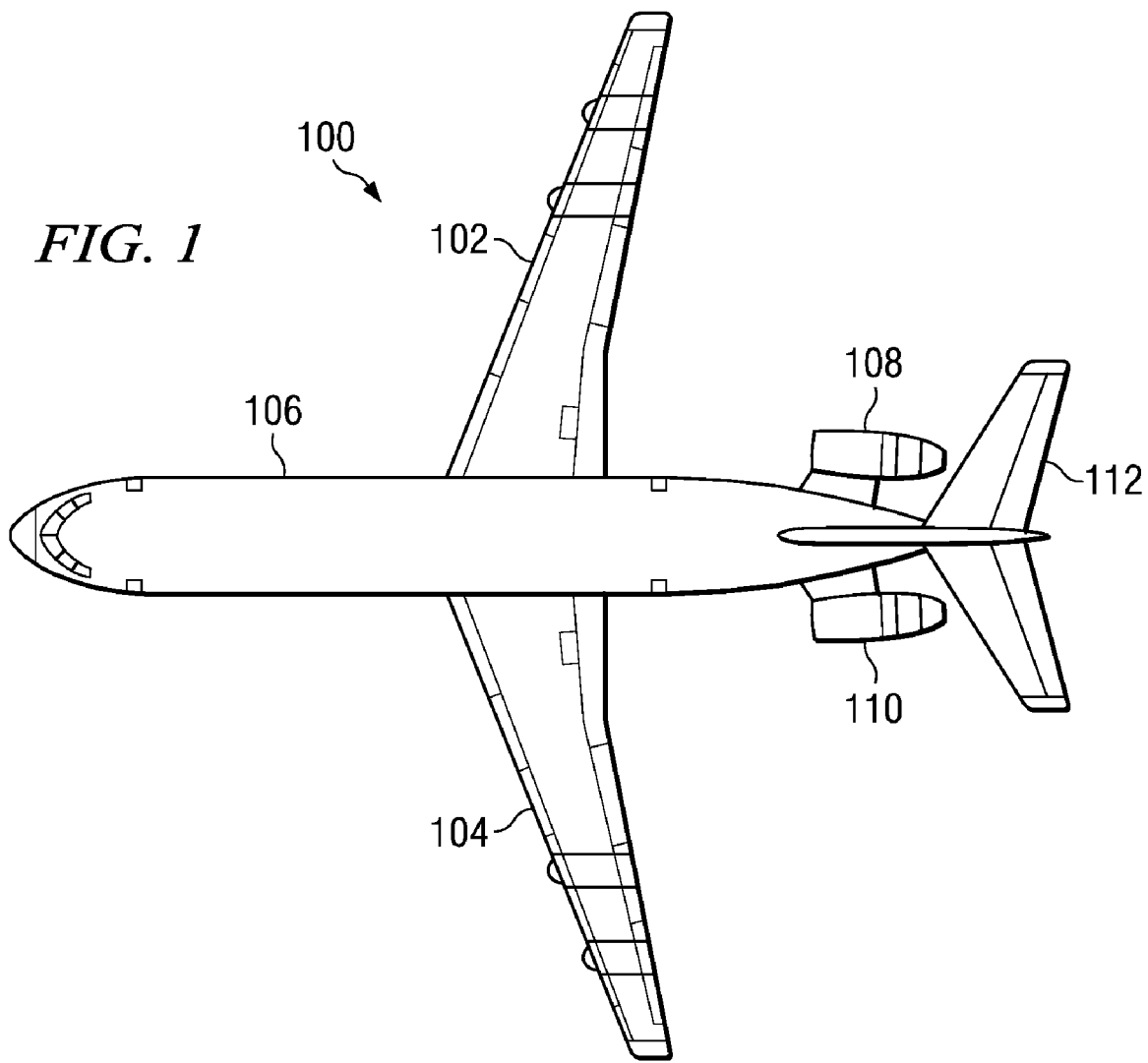
FIG. 1 is a diagram of an aircraft in which an advantageous embodiment the present invention may be implemented.

With reference now to the figures, and in particular, with reference to FIG. 1, a diagram of an aircraft is depicted in which an advantageous embodiment the present invention may be implemented. Aircraft 100 is an example of an aircraft in which an aircraft cabin air system may be implemented.

In this illustrative example, aircraft 100 has wings 102 and 104 attached to body 106. Aircraft 100 includes body mounted engine 108 body mounted engine 110 and tail 112.

Figure 2:
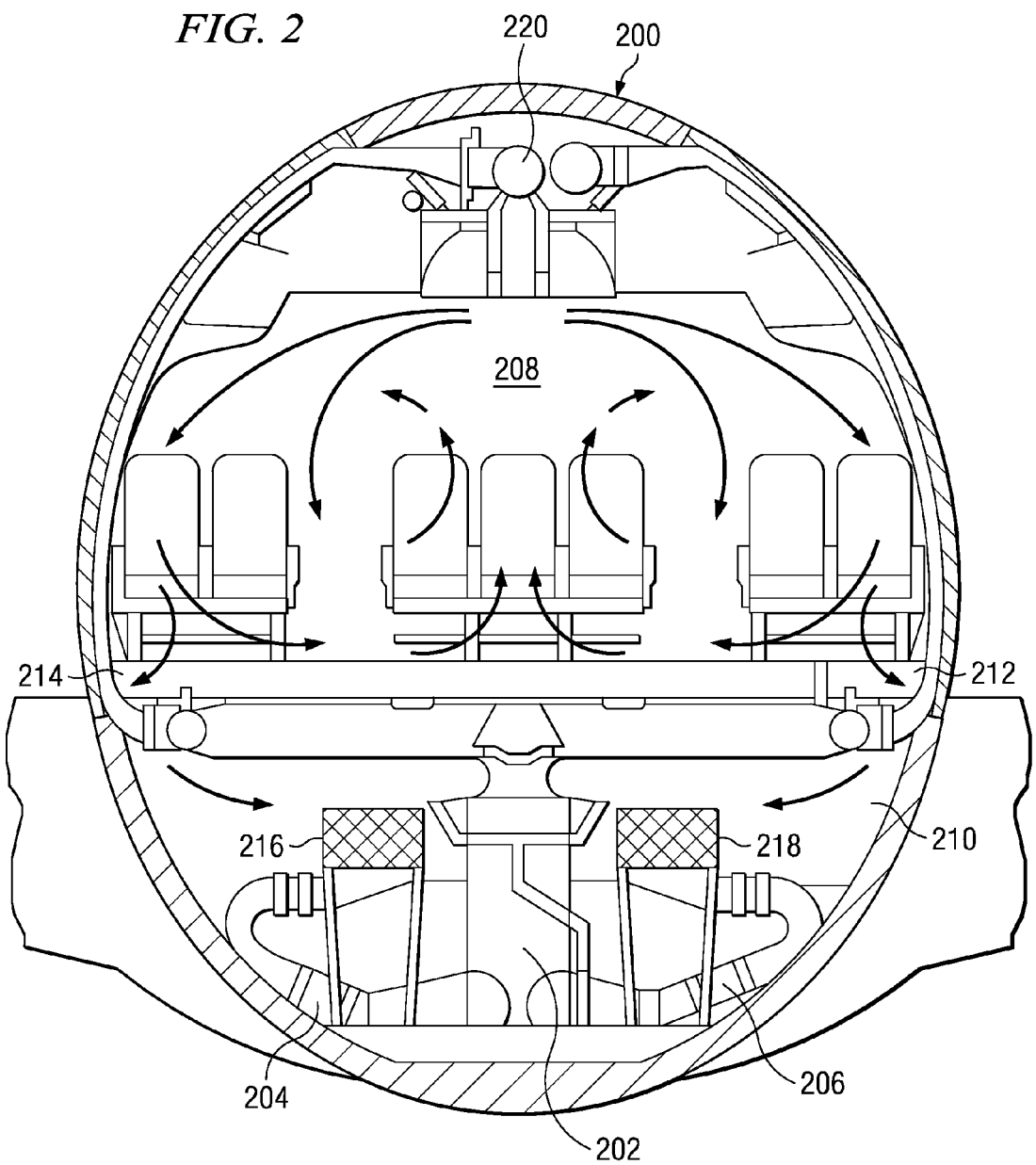
FIG. 2 is a cross section of a body of an aircraft in accordance with an advantageous embodiment of the present invention.

Turning next to FIG. 2, a cross section of a body of an aircraft is depicted in accordance with an advantageous embodiment of the present invention. In this example, body 200 is a cross section view of body 106 of aircraft 100 in FIG.

1. In this particular example, body 200 shows components for an aircraft cabin air supply system. As illustrated, air mix manifold 202 combines air from outside of the aircraft and re-circulated air. Re-circulation of a portion of the cabin air reduces ingestion of contaminants such as exhaust and other pollutants found on the taxi ways. The re-circulation of some air in the cabin also reduces the level of ozone exposure at high altitudes.

Air is driven using fans 204 and 206 in these examples. These fans push air into passenger cabin 208 and back out into bay 210 through cabin exhaust air outlets 212 and 214. This air is filtered through air filters 216 and 218 prior to mixing the re-circulated air with outside air by air mix manifold 202. In these illustrative examples, a filter is a device that removes contaminants. Contaminants take various forms, such as, for example, solid particulates and gases. Solid particulates may be, for example, dust, pollen, mold, bacteria, and viruses. This mixed air is redistributed into passenger cabin 208 though air distribution duct 220.

These components illustrated in FIG. 2 are part of an air distribution system also referred to as a cabin ventilation system. The air distribution system also includes other components not shown in this illustrative example. For example, air conditioning packs and a mixing chamber for mixing outside air and re-circulated air are examples of components that also may be present in the air distribution system, which are not shown.

Figure 3:
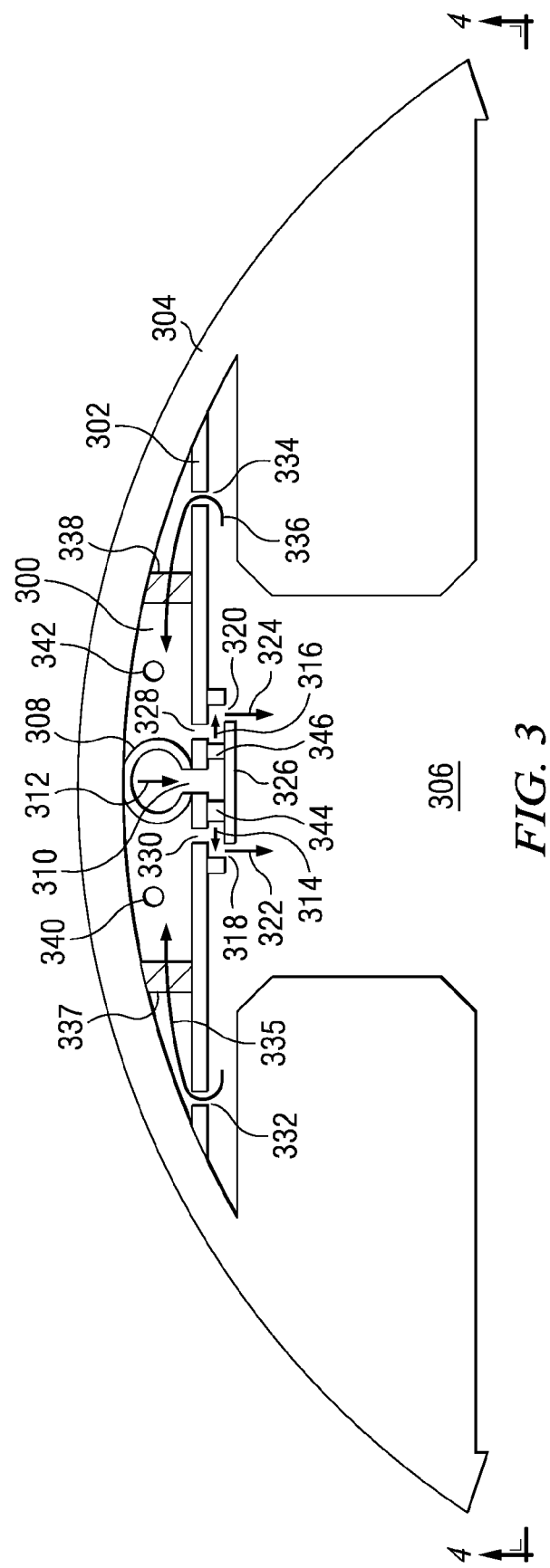
FIG. 3 is a diagram of a portion of an air distribution system in accordance with an advantageous embodiment of the present invention.

Turning now to FIG. 3, a diagram of a portion of an air distribution system is depicted in accordance with an advantageous embodiment of the present invention. In these examples, the air distribution system is an aircraft air processing system used in an aircraft cabin air system in an aircraft.

As depicted, crown 300 is the cavity formed by ceiling panel 302 and fuselage 304 above passenger cabin 306. In this particular example, air distribution duct 308 contains outlet 310 through which air flows in the direction of arrow 312 out of air distribution duct 308. The air then flows outboard or inboard along the direction of arrows 314 and 316 though nozzles 318 and 320 to finally flow in the direction of arrows 322 and 324. The configuration may have other direction(s) of airflow without departing from the scope of the invention. This airflow from air distribution duct 308 is referred to as a primary airflow in these examples. The placement of nozzle section 326 between passenger cabin 306 and outlet 310 forms nozzles 318 and 320.

This airflow is a primary airflow that draws air from within crown 300 into passenger cabin 306 through outlets 328 and 330. The airflow through outlet 310 and nozzles 318 and 320 results in a low pressure area occurring near outlets 328 and 330, which causes air to flow from crown 300 into nozzles 318 and 320. This airflow in turn causes air to be drawn from within passenger cabin 306 into crown 300 through inlets 332 and 334 in the direction of arrows 335 and 336. The air, drawn into crown 300, is then re-circulated into passenger cabin 306 though outlets 328 and 330. The re-circulation of air by this airflow is a re-circulation of air present in passenger cabin 306 and does not involve mixing the air in passenger cabin 306 with outside air in these examples.

Further, this re-circulation of air occurs without requiring additional fans to move the air and is referred to as a secondary airflow. Consequently, no additional power usage is required to generate this secondary airflow that re-circulates air in the passenger cabin. Instead, the movement of air is accomplished through air drawn from or entrained from passenger cabin 306 as a result of airflow out through nozzles 318 and 320. The momentum of air from air distribution duct 308 is used to entrain cabin air and thereby increase the total apparent ventilation rate to the cabin without enlarging the ventilation system (e.g., ducts, fans, or valves).

In these illustrative examples, two types of airflows occur, primary and secondary. The primary airflow has air, originally from air distribution duct 308, which is distributed into cabin 306 through nozzles 318 and 320. The secondary airflow is generated through the re-circulation of air between crown 300 in passenger cabin 306 through inlets 332 and 334 and through outlets 328 and 330. Further, outlets 328 and 330 can be slanted or angled to alter airflow.

Further, in addition to providing further re-circulation of air within passenger cabin 306, contaminants are removed from the re-circulated air using a contaminant removal system. In these examples, the contaminant removal system may employ different mechanisms, such as filters 337 and 338 and ultraviolet light units 340 and 342.

In the illustrative examples, filters 337 and 338 may use various mechanisms to remove contaminants. For example, the filters may implement direct interception. This type of filter consists of matrices with defined pores. If particles are larger than the pores, the particles are removed by direct interception. The filters also may contain a section that removes particles using inertial impaction. This portion of the filter removes particles smaller than the pore size by using inertial impaction. With this type of filtering, particles of higher density than the air deviate from the airflow and impact on the solid surfaces or walls of pores where the particles adhere.

Another mechanism that may be used to remove particles is called diffusional interception. For very small particles, such as viruses, Brownian motion causes particles to be collected on the individual fibers and pore walls. These different capturing mechanisms may be only examples of mechanisms that are used in different embodiments of the present invention. Of course, other mechanisms may be used to remove contaminants in addition or in place of these.

The materials used in filters 337 and 338 may take various forms. For example, filters 337 and 338 may be implemented using materials, such as foam, pleated paper, or spun fiberglass elements. Additionally, filters 337 and 338 also may contain charcoal to remove odors. The charcoal may be separate components or may be impregnated into synthetic fibers. Another component that may be used to remove odors in these illustrative examples is zeolite. This component may be bonded to polyester within a filter.

In other examples, filters may be implemented using an electrostatic charge to attract dust particles. One example of a filter is a high efficiency particulate air (HEPA) filter. Further, components in the filter may be coated with chemicals or other materials that kill bacteria and viruses on contact.

In these depicted examples, ultraviolet light units 340 and 342 are implemented using germicidal ultraviolet lamps. These types of lamps are employed to inactivate microbial aerosols. For example, use of ultraviolet light units 340 and 342 may be used to inactivate or destroy tuberculosis bacteria. The placement of ultraviolet light units 340 and 342 are selected to maximize the ability to destroy or inactivate different microbes, such as bacteria and viruses. In the illustrative embodiments, these units are placed in the portion of crown 300 in which the particle velocity is the lowest. In these examples, by increasing the time during which particles have exposure to ultraviolet light units 340 and 342, the likelihood of destroying or inactivating contaminants increases.

Additionally, reflective walls in the same direction as the airflow also helps increase the exposure of contaminants to ultraviolet light from these units. These reflective walls are walls in the crown that are constructed or coated in a manner to reflect the ultraviolet light. Reflecting the ultraviolet light increases the exposure of the contaminants to the ultraviolet light. By placing these units within the crown, exposure of passengers to ultraviolet light is eliminated. Further, in addition to the placement of ultraviolet light units 340 and 342, the type of ultraviolet lamps used with these units may be selected to provide the dose necessary to destroy or inactivate contaminants for a particular placement.

The exact placement and types of units employed depend on the particular aircraft in which these units are installed. Further, placing the units in an area in which a circulation pattern, such as a vortex, is present also increases the number of contaminants that are destroyed or inactivated. Other types of contaminant removal elements may be used in place of or in addition to filters and ultraviolet light units. For example, a device generating an electrostatic field to remove contaminants also may be employed.

In this example, nozzle section 326 is connected to ceiling 302 using connectors 344 and 346. These connectors are porous elements and allow air to flow from air distribution duct through nozzles 318 and 320. In these examples, these connectors are formed from thermally non-conductive materials and have dimensions of around 0.5 inches wide by around 0.5 inches high and are continuous along the cabin length. In these examples, nozzle section 326 has a width of around 9.0 inches and a height thickness of around 0.06 inches. The space between nozzle section 326 and ceiling 302 vary from around 0.25 inches to around 1.0 inches. These dimensions are provided for purposes of illustration of one particular example in which an advantageous embodiment may be implemented. The dimensions will vary depending on the particular implementation. The actual dimensions are selected in a manner that allows for the secondary airflow in which air is re-circulated through passenger cabin 306 in crown 300.

Further, inlets 332 and 334 form a set of inlets in these examples. The set of inlets may be one or more inlets. Depending on the particular implementation, other numbers of inlets may be used depending on the particular implementation. In a similar fashion, outlets 328 and 330 form a set of outlets. The set of outlets may be the one or more outlets, and other numbers of outlets may be used depending on the particular implementation.

Figure 4:
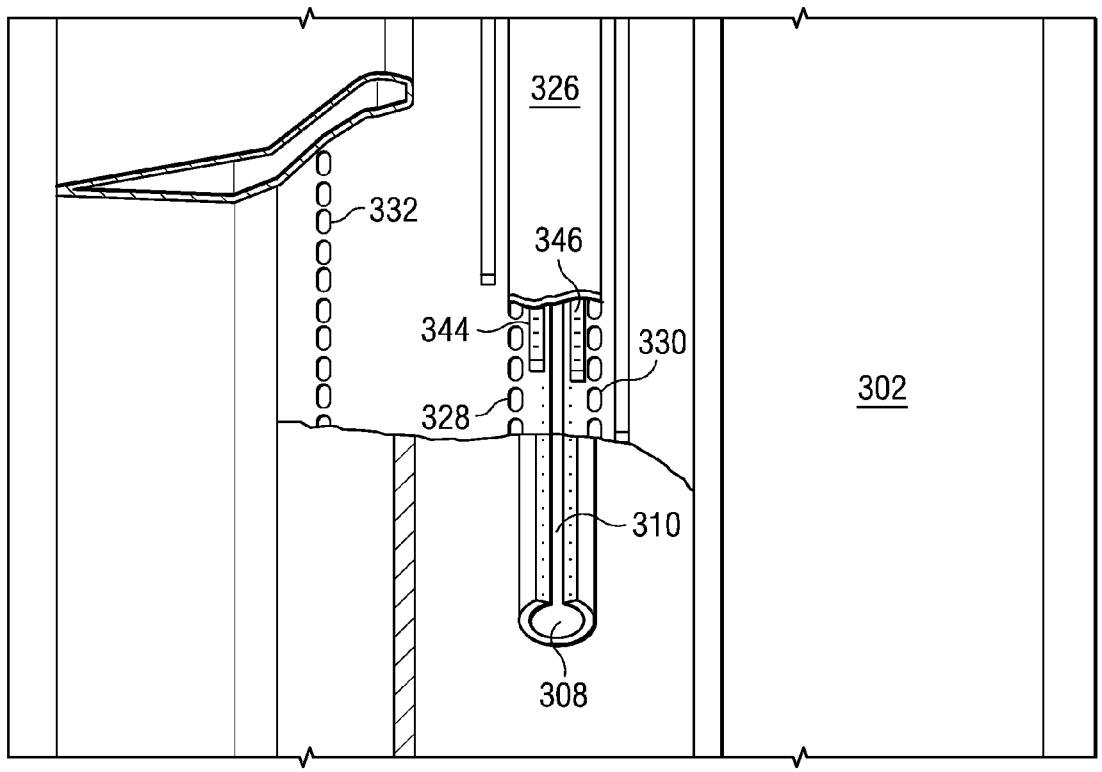
FIG. 4 is a diagram illustrating a view of a ceiling of a passenger cabin in accordance with an advantageous embodiment of the present invention.

Turning now to FIG. 4, a diagram illustrating a view of a ceiling of a passenger cabin is depicted in accordance with an advantageous embodiment of the present invention. In this example, FIG. 4 is a view of FIG. 3 taken along lines 4-4 in FIG. 3.

In these examples, the inlets and outlets are a half inch wide by three inches long. Eight inches are present between each outlet and inlet in a row along the cabin in these examples. In this example, inlet 332 is a series of channels leading from the cabin into the crown. Inlet 334 is not visible in this figure because they are obstructed by a portion of the cabin. Each of these channels is around 1.0 inches by around 0.5 inches and spaced around 1.5 inches apart in these examples. Additionally nozzle section 326 is shown with section cut away to depict outlet 328 and outlet 330. As with inlet 332, outlet 328 and outlet 330 are formed though a series of channels. These channels are around 1.0 inches by around 0.5 inches and spaced around 0.5 inches apart from each other. This view also shows outlet 310 in air distribution duct 308. The dimensions and spacing may vary depending on the particular implementation. These examples are provided merely for purposes of providing an example are not meant to limit the manner in which the different embodiments may be implemented.

Figure 5B:
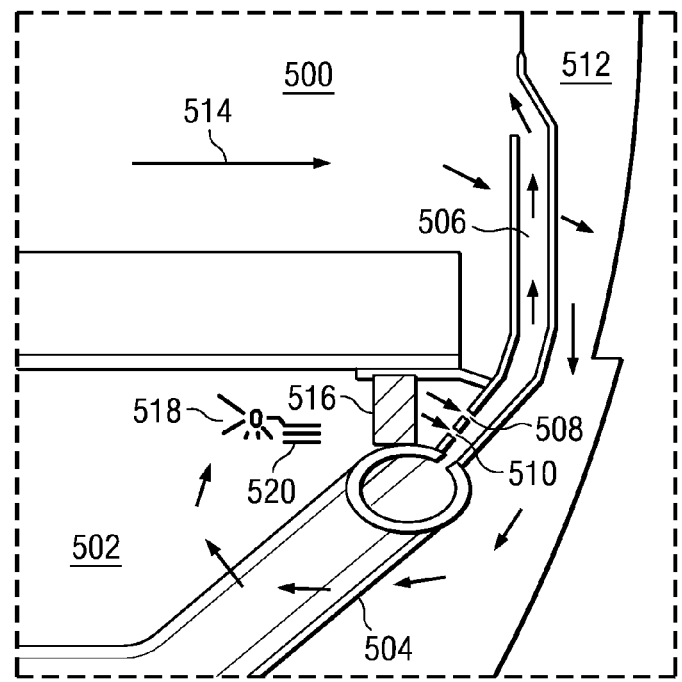
FIGS. 5A and 5B are diagrams illustrating a portion of an air distribution system that is located in a bay below the floor of the passenger cabin in accordance with an advantageous embodiment of the present invention.
Figure 5A:
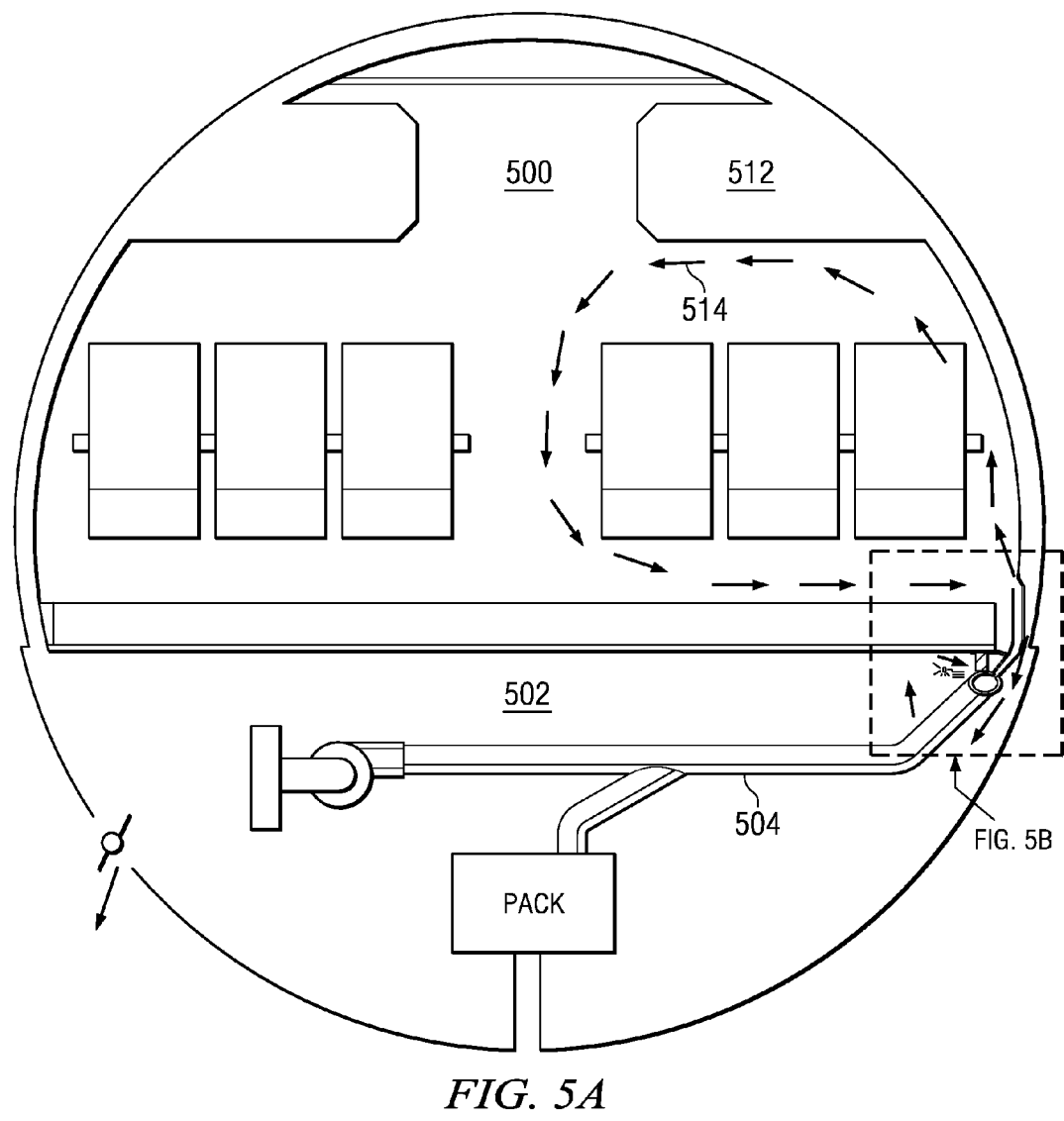

Turning now to FIGS. 5A and 5B, diagrams illustrating a portion of an air distribution system that is located in a bay below the floor of the passenger cabin is depicted in accordance with an advantageous embodiment of the present invention. FIG. 5B is a detailed depiction of a section in FIG. 5A.

In this example, passenger cabin 500 is located over bay 502. Air distribution duct 504 is a conduit for airflow into nozzle 506 and subsequently into passenger cabin 500. This airflow is a primary flow of air into cabin 500. A secondary flow of air driven by this primary airflow occurs with air being drawn through outlets 508 and 510 into nozzle 506. These two outlets form entrainment openings through which the secondary airflow is driven in this illustrative embodiment. When air is drawn into nozzle 506 through outlets 508 and 510, this air is drawn out into cabin 500 through outlet 512, which is located behind or beside nozzle 506. The secondary airflow is shown through arrows 514 in these examples.

As the air flows out of passenger cabin 500 into bay 502 through outlet 512, the air is processed with a contaminate removal system. In this example, the contaminate removal system includes filter 516, ultraviolet unit 518, and electrostatic/electrophoresis unit 520. As with the embodiments illustrated in the crown of the aircraft, this implementation does not require any additional use of power or fans to drive a secondary airflow.

Thus, the illustrative embodiments of the present invention provide an air distribution apparatus. This air distribution apparatus includes an air distribution vent that distributes air into a compartment. The distribution of air into a compartment causes compartment air to be drawn from the compartment. A contaminant removal system is used to process the compartment air drawn from the compartment to remove contaminants before being distributed back into the department through the air distribution vent.

Further, the embodiments in the illustrative examples depict the contaminant removal system being located in the crown or the bay of the aircraft. The contaminant removal system may be configured in other ways depending on the particular implementation. For example, a portion of the contaminant removal system may be located in the bay while another portion is located in the crown. For example, ultraviolet light units may be located in the crown of the aircraft while the filters are located in the bay.

In these examples, the air distribution system is an aircraft air processing system used in an aircraft. The air distribution system illustrated in these examples may be implemented to process and distribute air in other types of compartments or enclosed spaces. For example, the air distribution system in the illustrative embodiments may be applied to a train passenger cabin, an office, or some other room or passenger cabin.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. An aircraft air processing system comprising:
a first channel connecting a passenger cabin in an aircraft to a secondary area in the aircraft;
a second channel connecting the passenger cabin to the secondary area;
an air supply conduit in the secondary area, the air supply conduit having an outlet;
a nozzle section between the outlet and the passenger cabin, the nozzle section forming at least one nozzle for directing a first airflow from the outlet through the at least one nozzle into the passenger cabin, the at least one nozzle positioned with respect to the first channel such that the first airflow draws air from the passenger cabin into the secondary area through the second channel and recirculates the air drawn from the passenger cabin into the secondary area back to the passenger cabin through the first channel and through the at least one nozzle to form a second airflow that circulates between the passenger cabin and the secondary area through the first channel and the second channel; and
a contaminant removal system in the secondary area and positioned in the second airflow to remove contaminants from the second airflow entering the secondary area from the passenger cabin through the second channel before the second airflow returns to the passenger cabin through the first channel and through the at least one nozzle.

2. The aircraft air processing system of claim 1, wherein the at least one nozzle is associated with the outlet to cause the second airflow to move in a manner that increases a ventilation rate in the passenger cabin.

3. The aircraft air processing system of claim 1, wherein additional use of power is unnecessary to generate the second airflow and to remove the contaminants from the second airflow.

4. The aircraft air processing system of claim 1, wherein the contaminant removal system is a filter.

5. The aircraft air processing system of claim 1, wherein the contaminant removal system is an ultraviolet light system.

6. The aircraft air processing system of claim 4, wherein the filter is a high efficiency particulate air filter.

7. The aircraft air processing system of claim 4, wherein the filter is comprised of at least one of foam, pleated paper, charcoal, zeolite, and fiberglass elements.

8. The aircraft air processing system of claim 4, wherein the contaminant removal system also includes an ultraviolet light source, wherein the ultraviolet light source destroys bacteria and viruses in the second airflow moving though the secondary area.

9. The aircraft air processing system of claim 1, wherein the first airflow causes a low pressure area to occur around the first channel to cause the second airflow.

10. The aircraft air processing system of claim 1, wherein the secondary area is located in at least one of a crown and a bay in the aircraft.

11. The aircraft air processing system of claim 1, wherein the nozzle section forms a nozzle on each of opposite sides of the nozzle section.

12. The aircraft air processing system of claim 1, wherein the first channel and the second channel extends through a ceiling that separates the passenger cabin from the secondary area.

13. The aircraft air processing system of claim 1, further comprising at least one porous connector connecting the nozzle section to a ceiling that separates the passenger cabin from the secondary area, the first airflow flowing from the outlet through the at least one porous connector and through the at least one nozzle.

14. The aircraft air processing system of claim 1, wherein the first channel and the second channel each comprises a plurality of spaced openings.

* * * * *